Dec. 3, 1957  K. L. TREIBER  2,814,870
COMBINED UTENSIL
Filed June 15, 1956
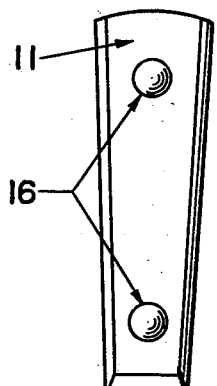
Fig. 1
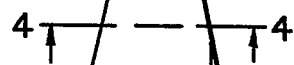
Fig. 4
Fig. 3
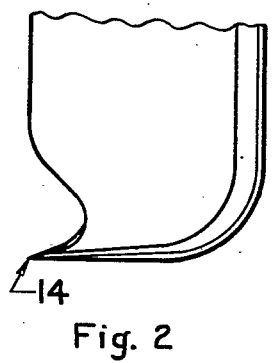
Fig. 2
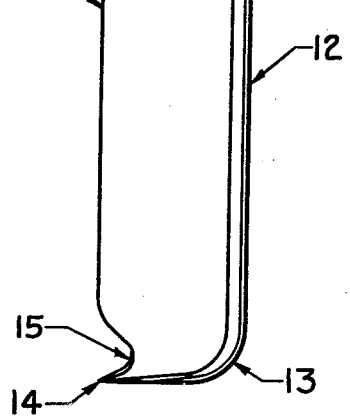
INVENTOR
Kenneth L Treiber

United States Patent Office 2,814,870
Patented Dec. 3, 1957

2,814,870

COMBINED UTENSIL

Kenneth L. Treiber, Alexandria, Va.

Application June 15, 1956, Serial No. 591,748

1 Claim. (Cl. 30—142)

My invention relates to a combined utensil and more particularly to a combined utensil especially for use by housewives, cooks or chefs when frying or grilling.

The purpose of this invention is to provide a spatula-like utensil which also embodies the characteristics of a kitchen knife and a kitchen fork and which will do the work of all three.

One object of my invention is to provide a combined utensil which is a spatula, knife and fork without making adjustments to the utensil.

Another object is to make a combined utensil which can be used as a spatula, a knife or a fork depending on how it is held in the hand.

A further object is to make a combined utensil which will save the housewife, cook or chef, time, by not having to reach for another utensil.

A still further object is to make a combined utensil which will save the housewife or cook the effort of having to store, maintain and wash three utensils.

Yet another object is to make a combined utensil which is efficient, economical, intriguing, practical and attractive in use.

With these and other objects and advantages in view the invention embodies a spatula-like instrument shaped with a knife-edge along part of one side which may be used in severing, parting or slicing various articles of food being prepared or served; a pick or fork-like tine or projection at the end which may be used in arranging, moving, turning or stacking articles of food being prepared or served and all this without hindering or impairing the common use of the utensil as a spatula.

The purpose of this invention is to provide a spatula-like utensil which also embodies the characteristics of a kitchen knife and a kitchen fork and which will do the work of all three of them.

Other objects and advantages of my invention will become apparent from the following description when taken in connection with the drawing, wherein:

Figure 1 is a side view of the combined utensil embodying features of my invention.

Figure 2 is an enlarged view of a part of the utensil to show the end of the combined utensil to indicate clearly the fork tine and cutting edge.

Figure 3 is a cross section through the blade of the combined utensil at location 3—3 indicating the cutting edge, the square back of the knife and the flat blade.

Figure 4 is a cross section through the blade of the combined utensil at location 4—4 indicating the rectangular shape and flat blade near the handle.

Referring now to the drawing in greater detail, wherein like reference characters denote corresponding parts, the combined utensil is comprised of a flexible blade 10, a handle 11, a cutting edge 12 which extends around large curve 13 to pick 14, a pick 14, a neatly curved or "ogee" portion 15 to make room for the pick 14.

The blade 10 may be made out of stainless steel, plain steel, plastic or other suitable material.

The handle 11 may be made of wood with rivets 16 as shown or from plastic or other suitable material shaped as shown, bar shape, or formed to fit the hand.

The house-wife, cook or chef can use this combined utensil to cut foods, turn them over by sliding the blade under the food, lifting the food so that it falls on the opposite side to that on which it was heretofore resting on the skillet, or by inserting the pick into the food so that it is caught and can be lifted so that the food may be turned over to fry on the other side.

It will be understood that other modifications may be made in the design and shape of this utensil and in the material and combination of parts of this combined utensil without departing from the spirit of the invention.

What is claimed is:

A kitchen tool comprising a handle member, a spatula knife blade carried by said handle member, said spatula blade being longitudinally flexible, the end of said blade being substantially squared and sharpened, one longitudinal edge of said spatula blade being unsharpened and the other longitudinal edge of said spatula blade being sharpened and merging into said sharpened squared end by a gently rounded sharpened edge portion, said sharpened squared end terminating on the other longitudinal edge of said spatula blade in one side of a projection which does not protrude beyond the unsharpened longitudinal edge of said spatula blade, said projection having a longitudinal axis substantially at right angles to the longitudinal length of said blade and the portion of the unsharpened edge of said blade nearest the sharpened end recessed to provide an ogee curved portion which terminates with the other side of said projection as a pick whereby to provide a spear for engaging bacon or the like.

References Cited in the file of this patent

UNITED STATES PATENTS

| D. 42,622 | Gafinowitz | June 18, 1912 |
|---|---|---|
| 706,107 | Prentiss | Aug. 5, 1902 |
| 1,408,368 | Lewis | Feb. 28, 1922 |
| 1,479,015 | Steinman | Jan. 1, 1924 |
| 1,703,305 | Jenkins | Feb. 26, 1929 |
| 2,484,692 | De Luce | Oct. 11, 1949 |
| 2,593,674 | Harnsberger | Apr. 22, 1952 |
| 2,630,591 | Smith | Mar. 10, 1953 |